D. REID.
Fertilizer.
No. 9,697.
Patented May 3, 1853.
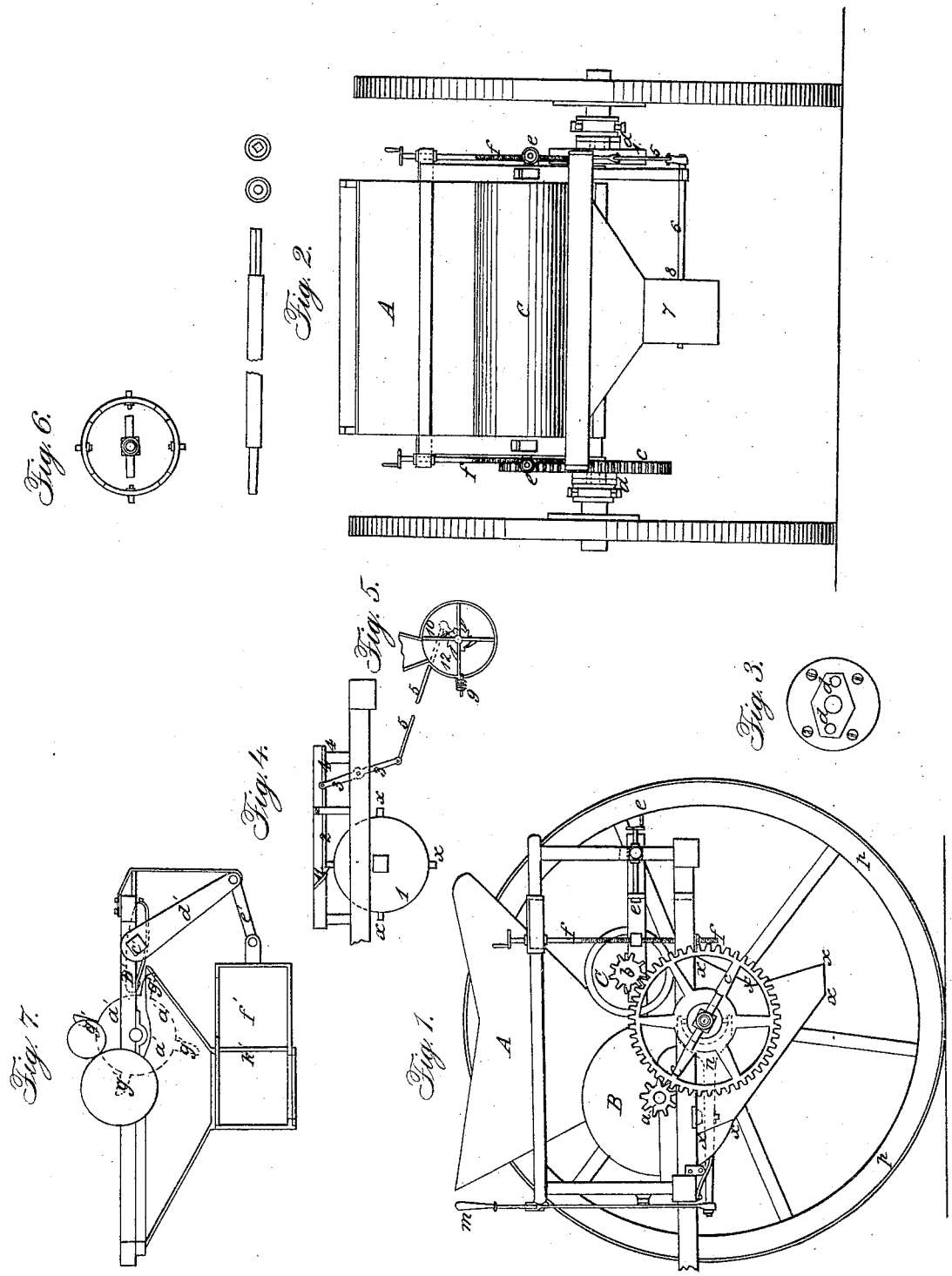

UNITED STATES PATENT OFFICE.

DANIEL REID, OF WASHINGTON, NORTH CAROLINA.

IMPROVEMENT IN MANURE-CARTS.

Specification forming part of Letters Patent No. 9,697, dated May 3, 1853.

*To all whom it may concern:*

Be it known that I, DANIEL REID, of the town of Washington, county of Beaufort, and State of North Carolina, have invented a new and Improved Manure-Cart or Cart for Scattering or Spreading Manure; and I do hereby declare that the following is a full and exact description thereof, reference being had to the accompanying drawings, and to the letters of reference marked thereon.

The nature of my invention consists in spreading the guano or other manure equally on the surface passed over by the cart, or in depositing the same in hills at regular intervals.

To enable others skilled in the art to make and use my invention, I will proceed to describe its construction and operation.

The machine upon which the manure is placed is a cart upon which rests a hopper, A, Figure 1, into which the manure is thrown for distribution. This hopper can be made of any denomination of form to suit the purpose. Under this hopper are two feed-rollers, Fig. 1, B and C, for feeding in the manure, which are so arranged that they can rotate on their shaft in the same or in opposite directions, as may be required, and this would depend upon the kind of manure used, fine manure requiring the rollers to revolve in the same and coarse in opposite directions, or nearest sides both down. These rollers B C, Fig. 1, are driven by pinions $a$ and $b$, Fig. 1, geared in a cog-wheel or rotating axle, $c$, Fig. 1. The bearings of one of the rollers are removable, and are to be adjusted by screws $f$, Figs. 1 and 2, or keys, according to the thickness it may be desired to spread the manure. On the inner end of the hub of both wheels there is a clutch and pin, Fig. 3 showing the arrangement, which, by being connected by a brake or levers on Fig. 1, are both placed in connection with a catch upon the axle and cause the axle to rotate with the cart-wheels $p$, Fig. 1, when operating upon the manure. When passing from place to place with a load of manure and it is not intended to spread it the clutches are relieved from the catch on the axle, and this allows the axle to rest and the cart-wheels to rotate in the usual way. The axle is caused to rotate in another manner, and that is by having one wheel tight and the other loose, the tight wheel causing the axle to rotate, and the loose wheel facilitating the turning around of the cart so as to move in an opposite direction to that passed over. In this case a sliding shutter is used between the hopper and feed-rollers, in order to shut off the manure.

The hilling operation, or that of dropping the manure in hills, is performed by having on the axle on one side of the cart and between the clutch-catch and the cart-body a small wheel, $a'$, Fig. 7, with projecting or normal pieces on its rim, Fig. 6. Above and to the rear of this wheel there is a bar-lever, $b'$, Fig. 7, with a gum-elastic or other spring. This lever-bar is on an axle, $c'$, Fig. 7, on the middle of which and in rear of the middle of the cart is a fixed arm, $d'$, Fig. 7, projecting downward and outward, and making an elbow toward the under part of the cart by means of another short bar, $e'$, Fig. 7. This short arm $e'$, Fig. 7, is attached to the end of a measuring or feeding box, $f'$, Fig. 7, which moves in and out of a frame placed under the feeding-rollers. This feeding-box has one-half of its top open and the one-half of its bottom open, and the part directly under the open part of the top is shut, so when the box passes into the groove of the frame under the feeding-rollers it will receive from that part which is open at the top, and as it is forced backward, as will be explained, the feeding-box closes the under part of the frame, and that manure held by the feeding-box is forced or drops out into a hill. This is effected in the following manner: The cart moving turns the axle, and consequently the small wheel $a'$, Fig. 7, upon it, the flanges or bars $g'$, Fig. 7, coming in contact with the spring-bar $b'$, Fig. 7, from its inner end downward until the flange has passed it, when it flies back by means of its spring to its first position. The movement of the bar $b'$ downward causes an outward movement of the bar $d'$, which being attached to the feeding or dropping box $f'$, Fig. 7, by means of the small bar $e'$, the feeding-box is drawn outward toward the rear, and that manure which was in the box is forced out into the ground by $k'$, Fig. 7—a permanent side of the square frame under the roller. The upper part of the feed-box directly under the frame is closed and prevents the escape of the manure until another flange of the wheel $a'$, Fig. 7, shall force downward the bar $b'$. These flanges $g'$, Fig. 7, are placed with respect to the distance usually required between the hills.

I claim as my invention and desire to secure by Letters Patent—

The measuring-valve apparatus beneath the lower hopper, in combination with the said hopper for discharging manure in hills, as set forth.

DANIEL REID.

In presence of—
GEO. C. THOMAS,
JOHN L. HAYES.